United States Patent [19]

Chang

[11] Patent Number: 5,598,725
[45] Date of Patent: Feb. 4, 1997

[54] STEERING WHEEL LOCK WITH ALARMING DEVICE

[76] Inventor: Chao-Sheng Chang, 6FL. No. 15, Lane 41, Section 4, Tsung-Shing Road, San-Tsung City Taipei Shieng, Taiwan

[21] Appl. No.: 620,548

[22] Filed: Mar. 28, 1996

[51] Int. Cl.$^6$ ................................... B60R 25/02
[52] U.S. Cl. .................. 70/209; 70/226; 70/DIG. 49; 340/425.5; 340/426
[58] Field of Search .................. 70/DIG. 49, 209, 70/211, 212, 225, 226, 237, 238, 239; 180/287; 340/425.5, 426

[56] References Cited

U.S. PATENT DOCUMENTS

| | | | |
|---|---|---|---|
| 4,833,442 | 5/1989 | Von Heck | 70/226 X |
| 5,055,823 | 10/1991 | Fuller | 70/237 X |
| 5,291,761 | 3/1994 | Lii | 70/212 X |
| 5,365,215 | 11/1994 | Carlo et al. | 340/425.5 X |
| 5,372,019 | 12/1994 | Hsiao | 70/238 X |
| 5,548,915 | 8/1996 | Szavmach et al. | 70/DIG. 49 X |

FOREIGN PATENT DOCUMENTS 3241705 10/1983 Germany ................ 180/287

*Primary Examiner*—Lloyd A. Gall
*Attorney, Agent, or Firm*—Pro-Techtor International

[57] ABSTRACT

A steering wheel lock equipped with all alarming device which can be actuated on the lock being sabotaged or cut off. The steering wheel lock has an alarm unit in connection to an actuation switch having a retractable button. An indirect transmission member has a spring biased drive pin the bottom of which can fall on a smooth front section or in a recess of the dentiform section of the lock stick so that the top end of the drive pin can be engageable with the retractable button of the actuation switch or can separate therefrom respectively. So, the first alarm means can be put in a reset mode and in an operation mode accordingly. As a burglar sabotages the steering wheel lock, the first alarm on the alert can be actuated as a result of shaking or vibration and produces alarm sound to the maximum level of 120 dB.

2 Claims, 16 Drawing Sheets

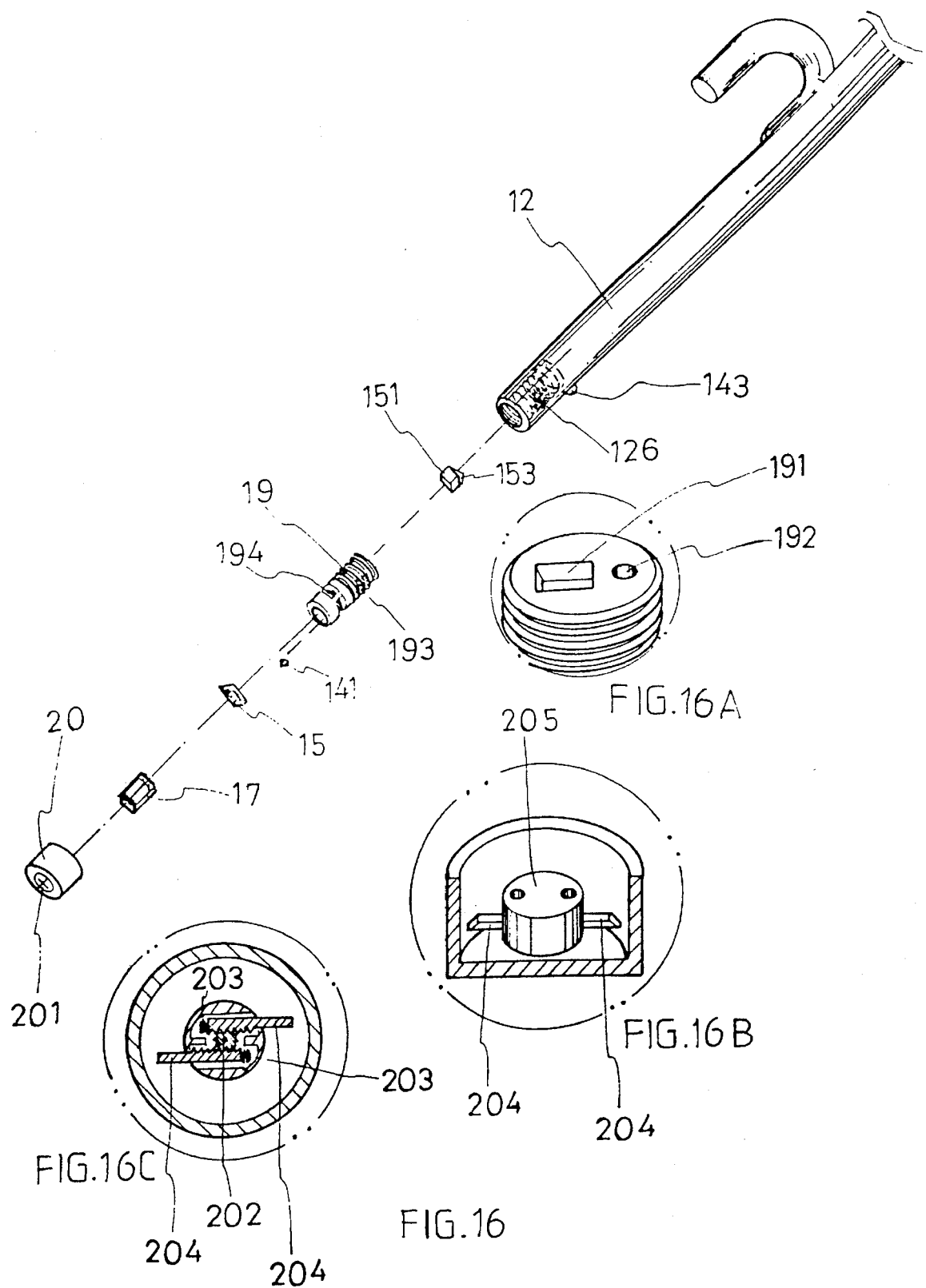

STEERING WHEEL LOCK WITH ALARMING DEVICE

BACKGROUND OF THE INVENTION

The present invention relates to a steering wheel lock equipped with an alarming device which can be actuated to produce alarm sound on the lock being sabotaged or cut off. The steering wheel lock has an alarm means in connection to an actuation switch having a retractable button. An indirect transmission means has a spring biased drive pin the bottom of which can fall on a smooth front section or in a recess of the dentiform section of the lock stick so that the top end of the drive pin can be engageable with the retractable button of the actuation switch or can separate therefrom respectively. So, the first alarm means can be put in a reset mode and in an operation mode accordingly. As a burglar sabotages the steering wheel lock, the first alarm on the alert can be actuated as a result of shaking or vibration and produces alarm sound to the maximum level of 120 dB.

Conventional steering wheel locks have only been used to protect vehicles from being stolen easily by burglars and are not equipped with any alarm means. So, a burglar can take his time in sabotaging a steering wheel lock without being put under any pressure. Those mechanical locks can be cut off at one end and be removed with ease, and vehicles are driven away without any alarm issued.

SUMMARY OF THE INVENTION

Therefore, the primary object of the present invention is to provide a steering wheel lock having an alarm device which can be set on the alert when the lock is applied to a steering wheel of a vehicle so that when the steering wheel lock is broken or sabotaged by a burglar, the alarm means will produce loud alarm sound to a maximum of 120 dB, scaring the burglar away.

BRIEF DESCRIPTION OF THE DRAWINGS

FIG. 2A is a diagram showing the reset pin of the second alarm means;

FIG. 2B is a diagram showing the actuation switch disposed on the first alarm means;

FIGS. 16, 16A, 16B, 16C are diagrams showing one further embodiment of the present invention with the connector and the bottom lid enlarged;

DETAILED DESCRIPTION OF THE PREFERRED EMBODIMENTS

Figure 1:
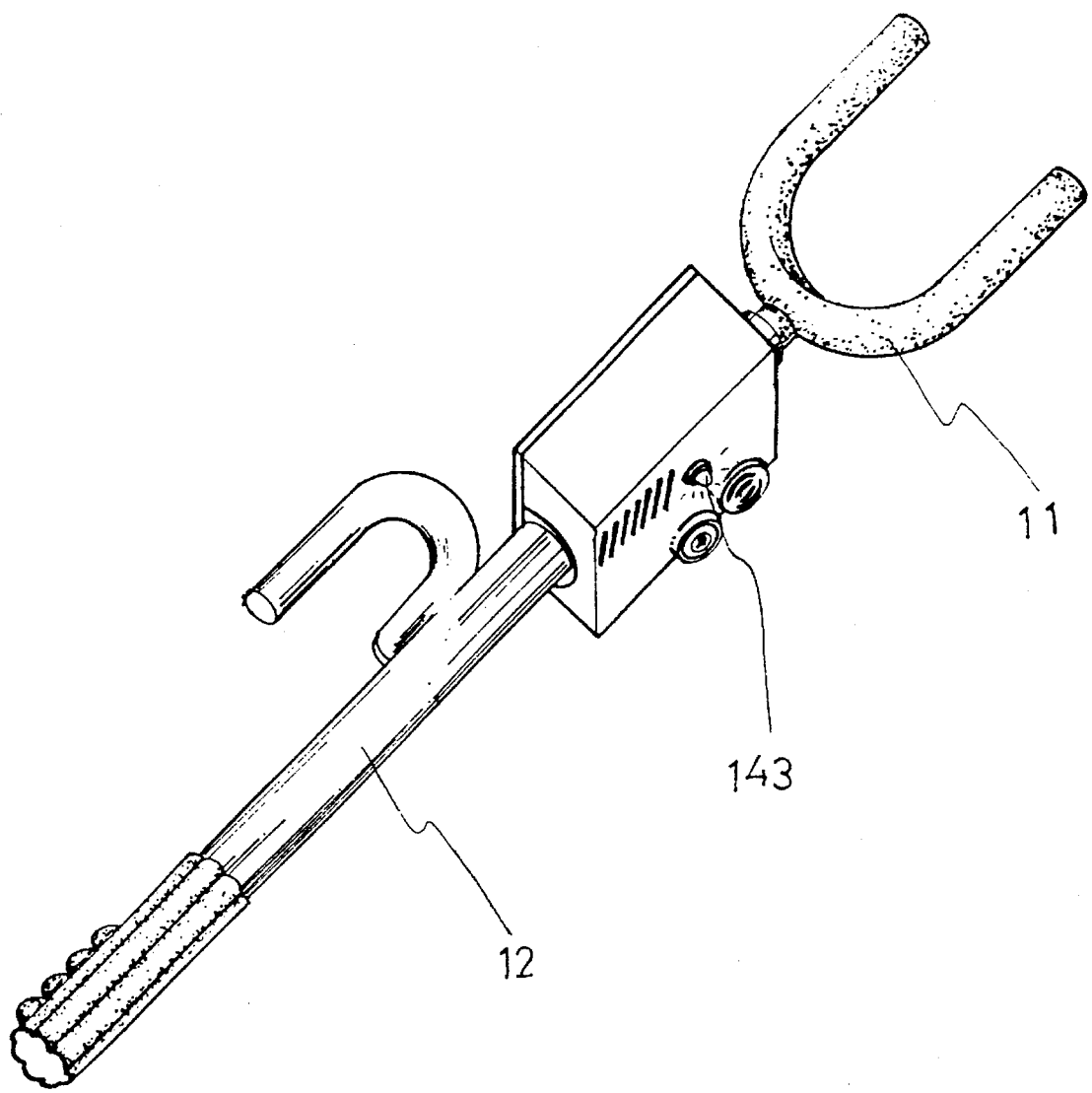
FIG. 1 is a diagram showing the structural appearance of the present invention.
Figure 2:
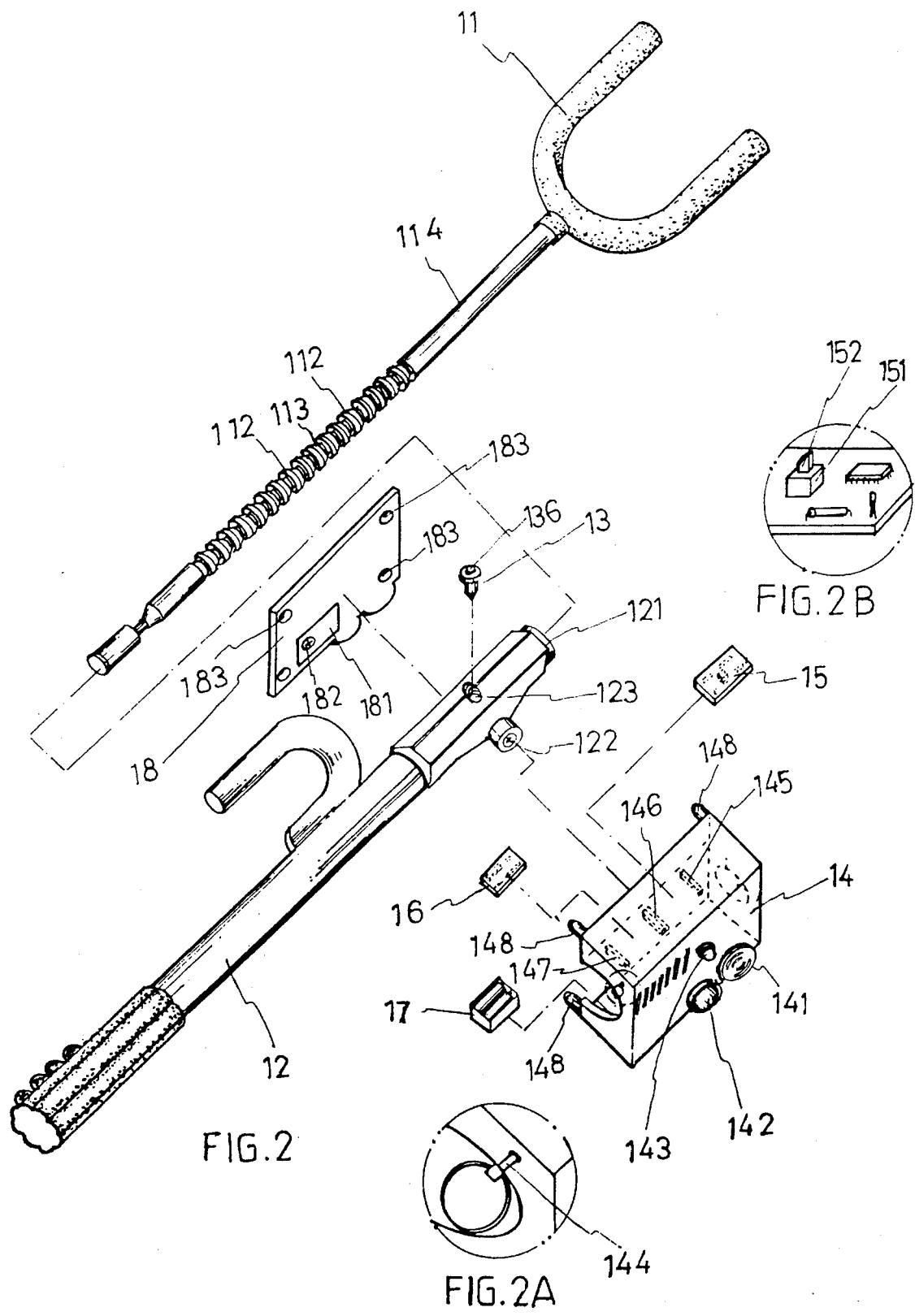
FIG. 2 is a perspective diagram showing the exploded components of the present invention.

Referring to FIGS. 1, 2, the steering wheel lock of the present invention is comprised of a lock stick 11, a receiving sheath 12, a guard box 14, a lid 18, a first alarm unit 15, a second alarm unit 16 and a power supply device 17. The lock stick 11 has a U-shaped retaining head in connection to a smooth front section 114 which is connected to a locking section having a plurality of spaced dentiform protrusions 112 with a recess 113 defined between every pair of the dentiform protrusions 112.

Figure 3:
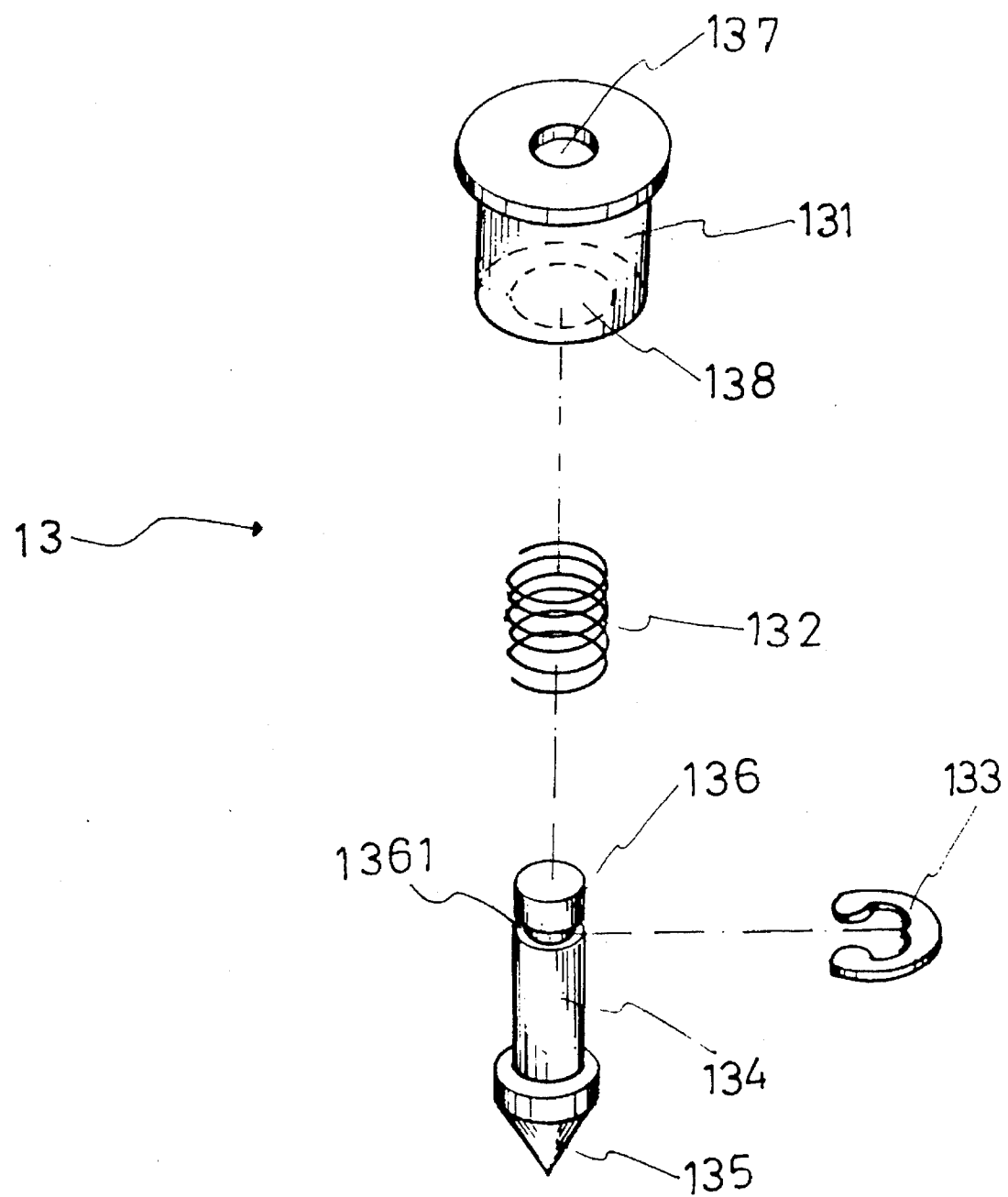
FIG. 3 is a diagram showing the indirect transmission means of the present invention.
Figure 4:
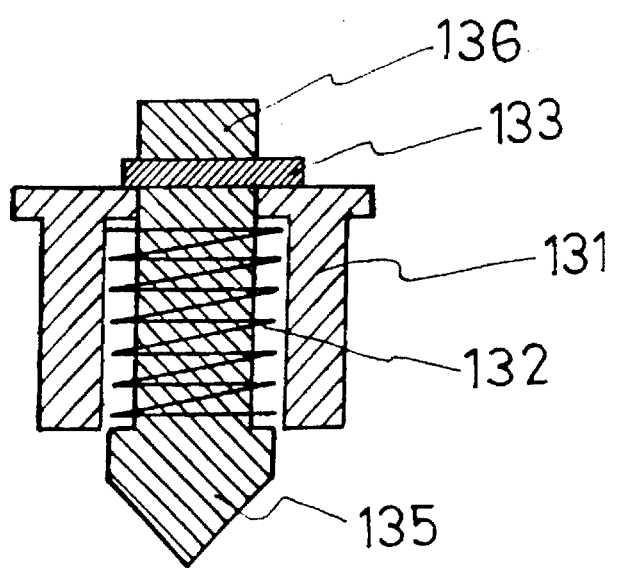
FIG. 4 is a sectional diagram showing the indirect transmission means.

Near the front end of the receiving sheath 12 is disposed a through hole 123 in which an indirect transmission means 13, as shown in FIG. 3, is located. The transmission means 13 is made up of a hollow retaining head 131 having a top through hole 137 and a bottom through hole 138; a bias spring 132; a drive pin 134 which has a cone-shaped driven end 135 and a groove 1361 at the top end 136 thereof, permitting the drive pin 134 to be fixedly engaged with the hollow retaining head 131 by a locking piece 133 which is engaged with the groove 1361 in assembly so that the drive pin can be retractably actuated, as shown in FIG. 4.

Referring to FIG. 2, the guard box 14 has a key mounting hole 142 and a speaker 141 is disposed adjacent to the key mounting hole 142, and an LED 143 is disposed next to the key mounting hole 142. A first alarm means 15 and a second alarm means 16 are connected to the speaker 141 and the LED 143 by wires (not shown).

On the ceiling of the guard box 14 are disposed a number of securing members 145, 146, 147 for fixing the first alarm means 15 and the second alarm means 16. The first alarm means 15 has an actuation switch 151 which is equipped with a retractable button 152. The top abutment end 136 of the indirect transmission means 13 is disposed in alignment with the retractable button 152 of the actuation switch 151 in such a manner that as the top abutment end 136 is urged to move upwardly, the retractable button 152 of the actuation switch 151 is accordingly compressed.

Referring to FIG. 2A, a reset pin 144 disposed in the corner of the guard box 14 is insertable into a key hole (not shown) of the second alarm means 16 so as to put the second alarm means 16 in a reset and non-operational mode. The second alarm means 16 can be actuated to produce alarm sound as soon as the reset pin 144 is pulled out.

Figure 5:
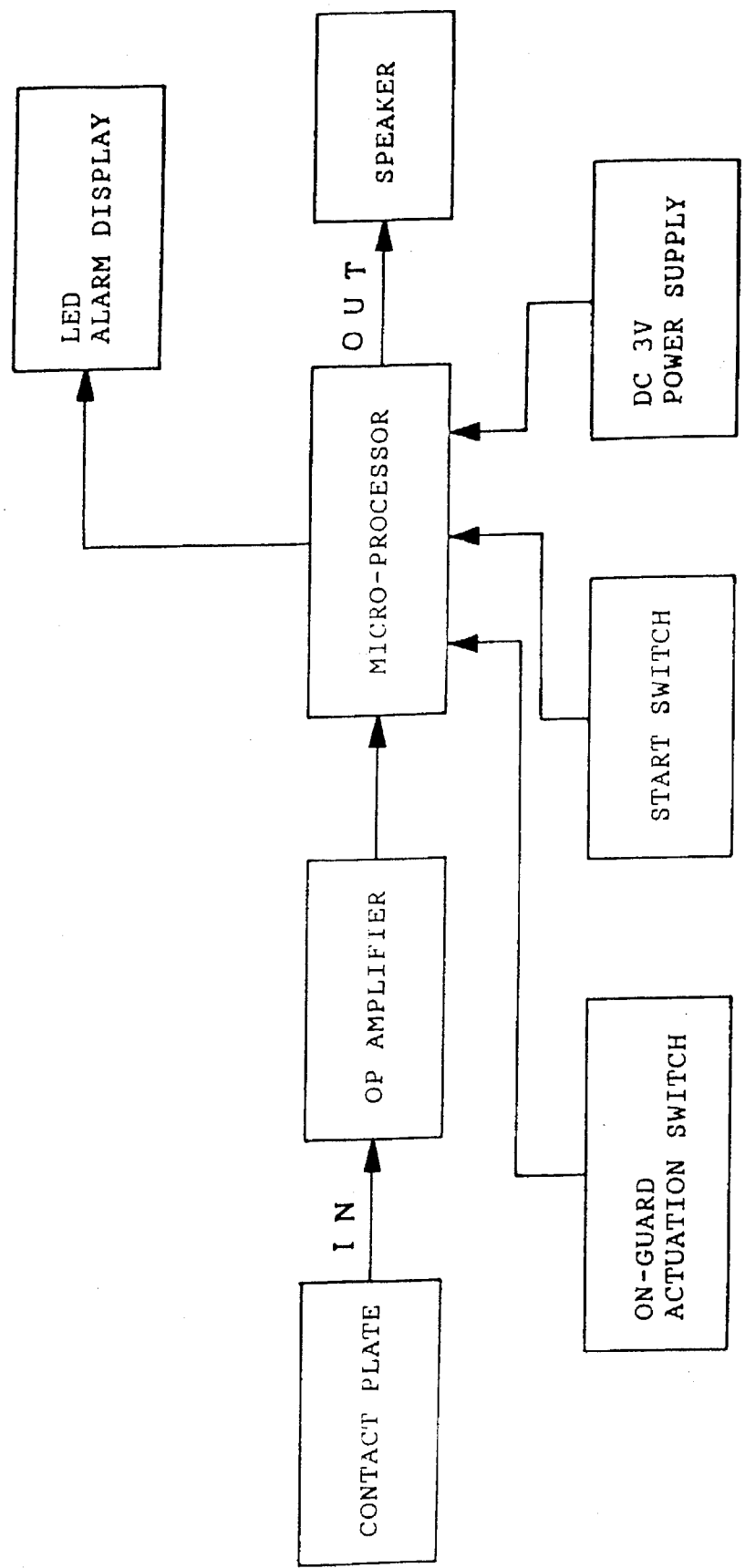
FIG. 5 is a block diagram of the first and second alarm means of the present invention.

As shown in FIG. 5, the first alarm means 15 and the second alarm means 16 have the same operation circuit. When they are shaken, detections are obtained by a pick-up means and the signals which are too small to be used are amplified 1000 times by an OP amplifier and then delivered to a CPU (a micro-processor) for judgement so as to actuate an alarm circuitry.

When an on-guard actuation means delivers signals to the CPU (micro-processor) for judgement and if the outcome is positive, speakers are actuated to produce alarm sound with its intensity gradually increased to 120 dB so as to scare a burglar away.

A start switch is used to help a user to ascertain that the present system is in a reset mode or is in an on-guard mode.

The alarm display is a bright LED which can flash to demonstrate various working conditions. The operation voltage of such circuit is only 3 V.

Referring to FIG. 2, the lid 18 has a number of holes 183 disposed in alignment with a number of fixing rivets 148 of the guard box 14 so as to permit the lid 18 to be easily engaged with the guard box 14. An openable door 181 having a lock means 182 is disposed on the lid 18 so that a battery disposed in the guard box can be replaced with ease.

Figure 8:
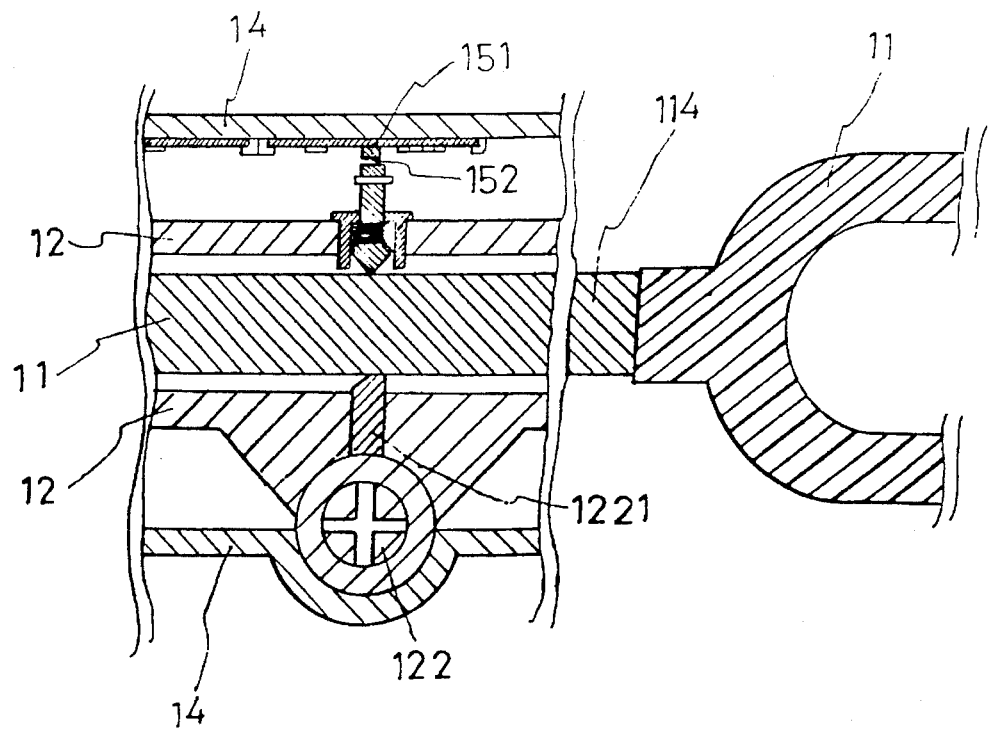

When the lock stick 11 is inserted into the lock sheath 12, the driven head 135 of the transmission means 13 is in abutment against the smooth front section 114, forcing the top end 136 to abut against the retractable button 152 of an actuation switch 151, as shown in FIG. 8, so as to put the first alarm means in a reset mode without functioning at all.

Figure 6:
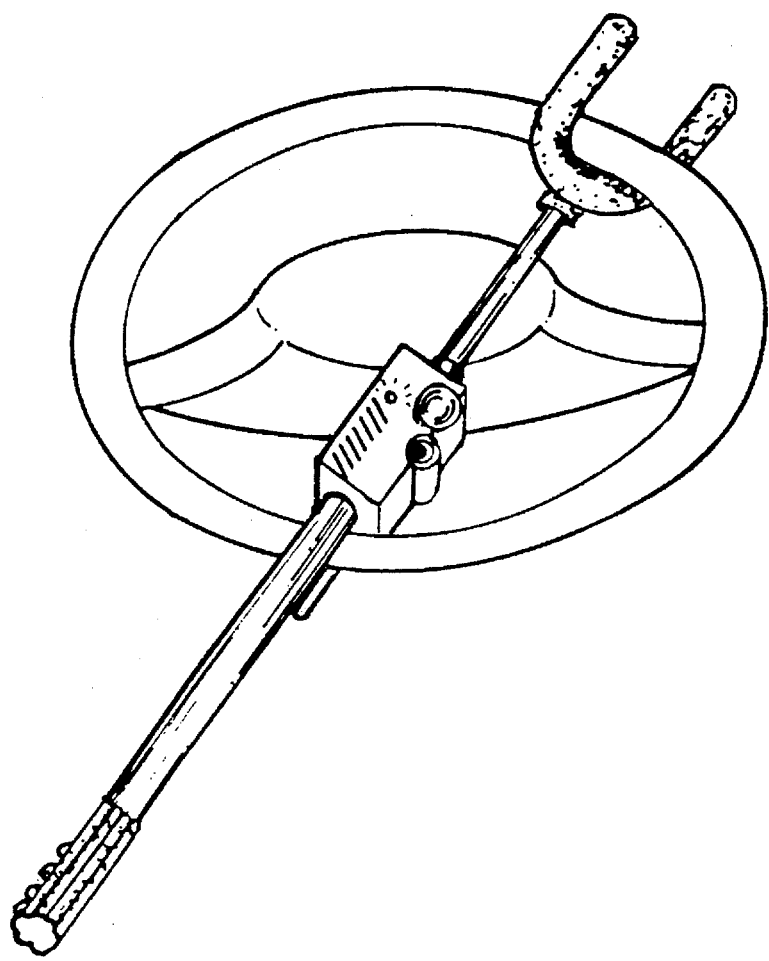
FIG. 6 is a diagram showing the application of the steering wheel lock of the present invention.
Figure 7:
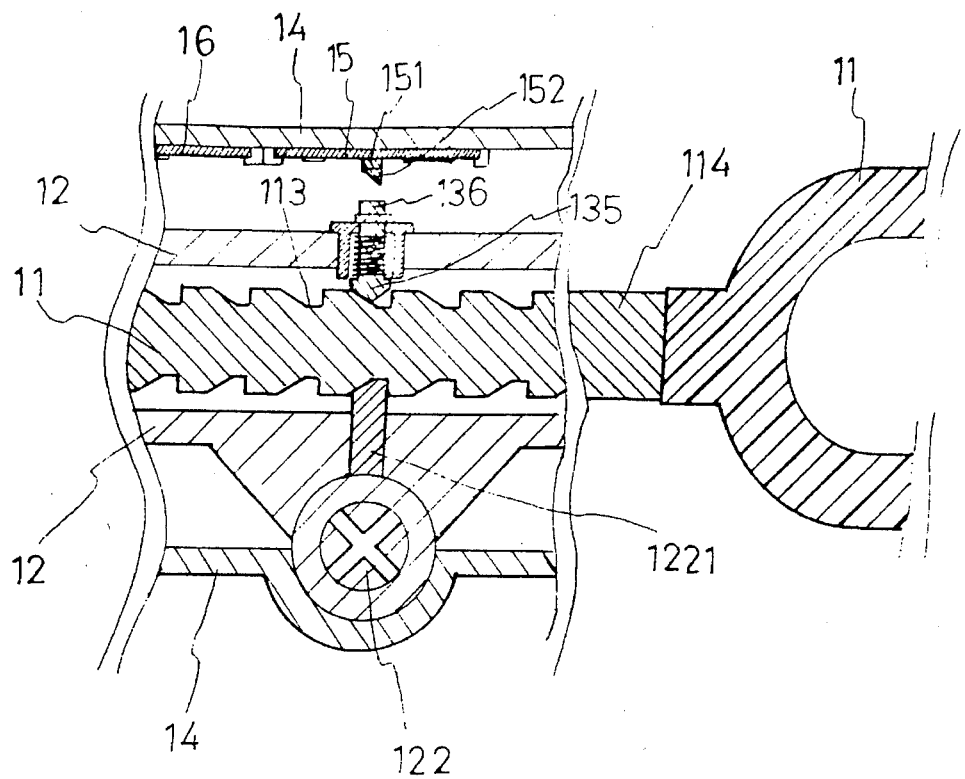
FIGS. 7, 8 are sectional diagrams showing the operation modes of the transmission means in relation with the actuation switch.

Referring to FIG. 6, as the steering wheel lock of the present invention is applied to a steering wheel of a vehicle, the lock stick 11 is outwardly pulled out of the receiving sheath 12, causing the driven end 135 of the indirect transmission means 13 to fall in one of the recesses 113 of the lock stick 11, as shown in FIG. 7 so as to keep the retractable button 152 of the actuation switch 151 free from the abutment of the top end 136 of the transmission means 13. Thus, the first alarm means 15 is actuated to function and is simultaneously kept on guard. In the meantime, the LED 143 flashes at a particular frequency constantly, getting on a break-in burglar's nerves.

If the lock stick 11 is pushed back into the receiving sheath 12, a latch pin 1221 of a lock 122 disposed at one end of the receiving sheath 12 engaged with one recess 113 of the lock stick will stop the lock stick 11 from moving backwardly. Only after the latch pin 1221 is reset into the lock 122, the lock stick 11 can be pushed back into the receiving sheath 12.

At this moment, a burglar tries to steal a vehicle by sabotaging the steering wheel lock, vibration and shaking will cause the first alarm means 15 to produce alarm sound with its intensity gradually building up to 120 dB and the LED flashing with increasing frequency so as to get on a burglar's nerves and stop a steal effectively.

When the steering wheel lock of the present invention is not mounted onto a steering wheel and is disposed aside of a driver, a reset pin 144 disposed on one side of the guard box 14 can be pulled out to make the second alarm means 16 produce alarm sound to attract people's attention so that a rescuer can be summoned.

Figure 9:
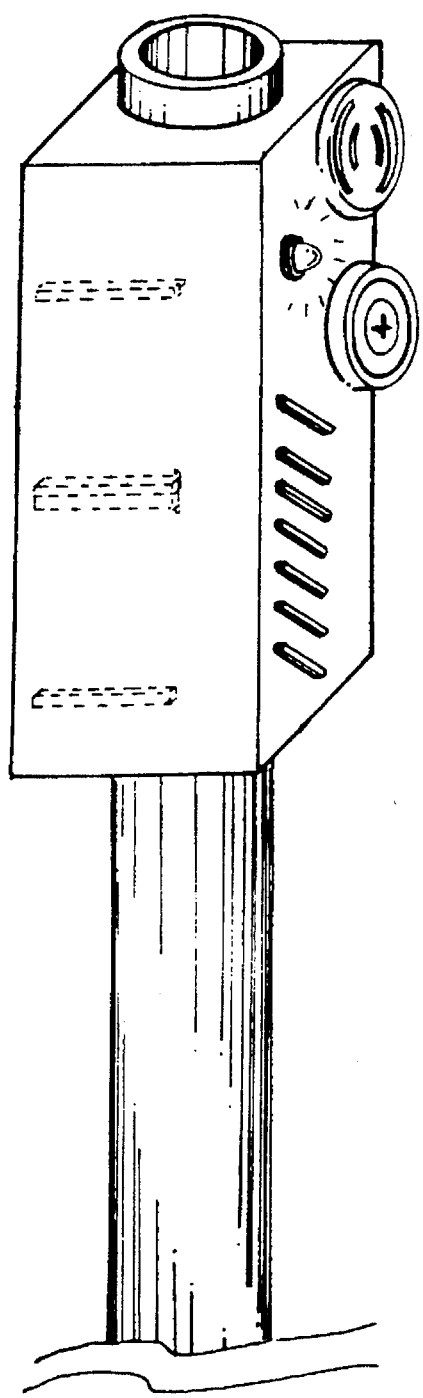
FIG. 9 is a diagram showing a guard box integrally formed with a receiving sheath of the present invention.
Figure 10:
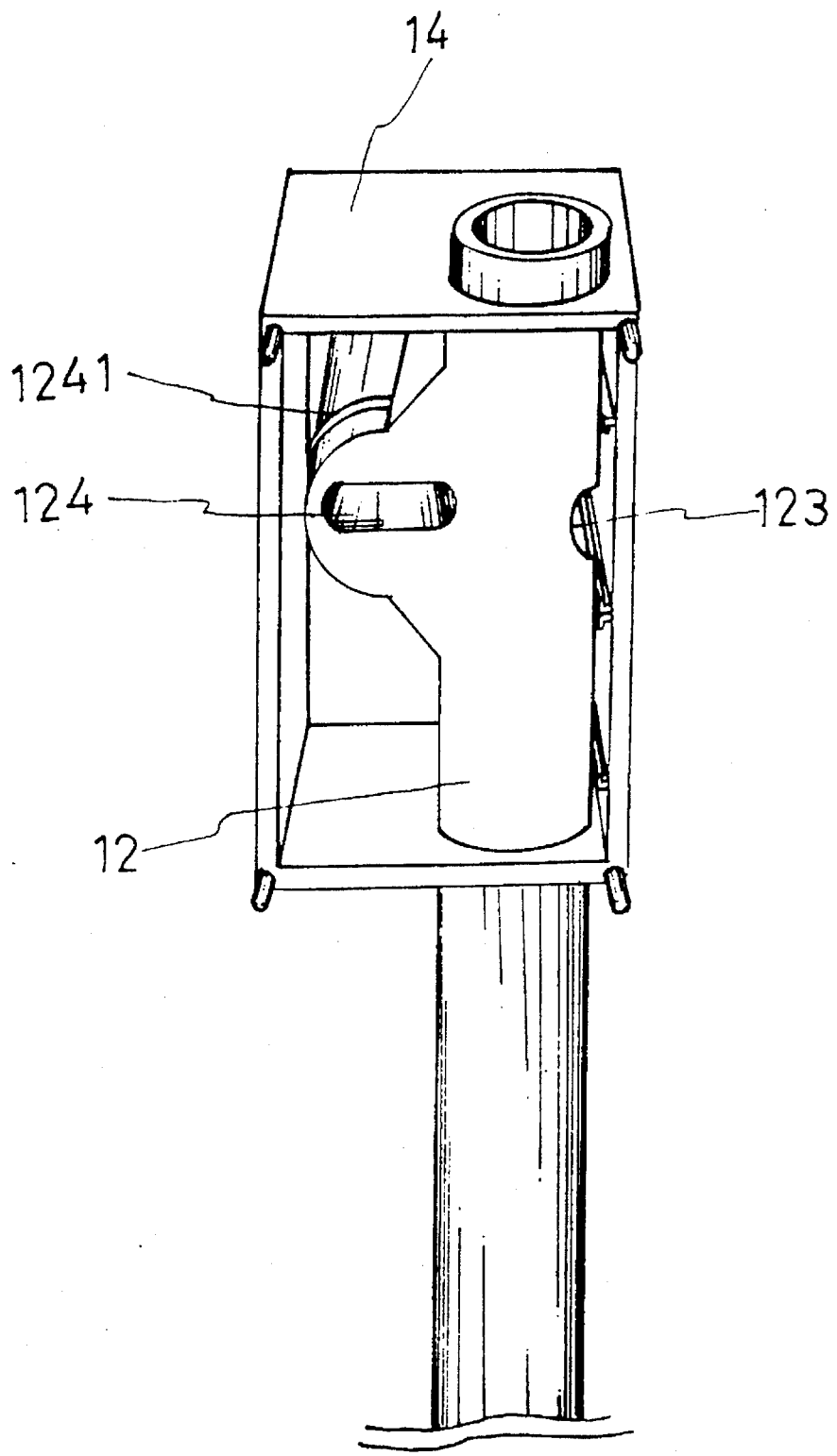
FIG. 10 is a perspective diagram showing the inner structure of an integrally formed guard box.
Figure 11:
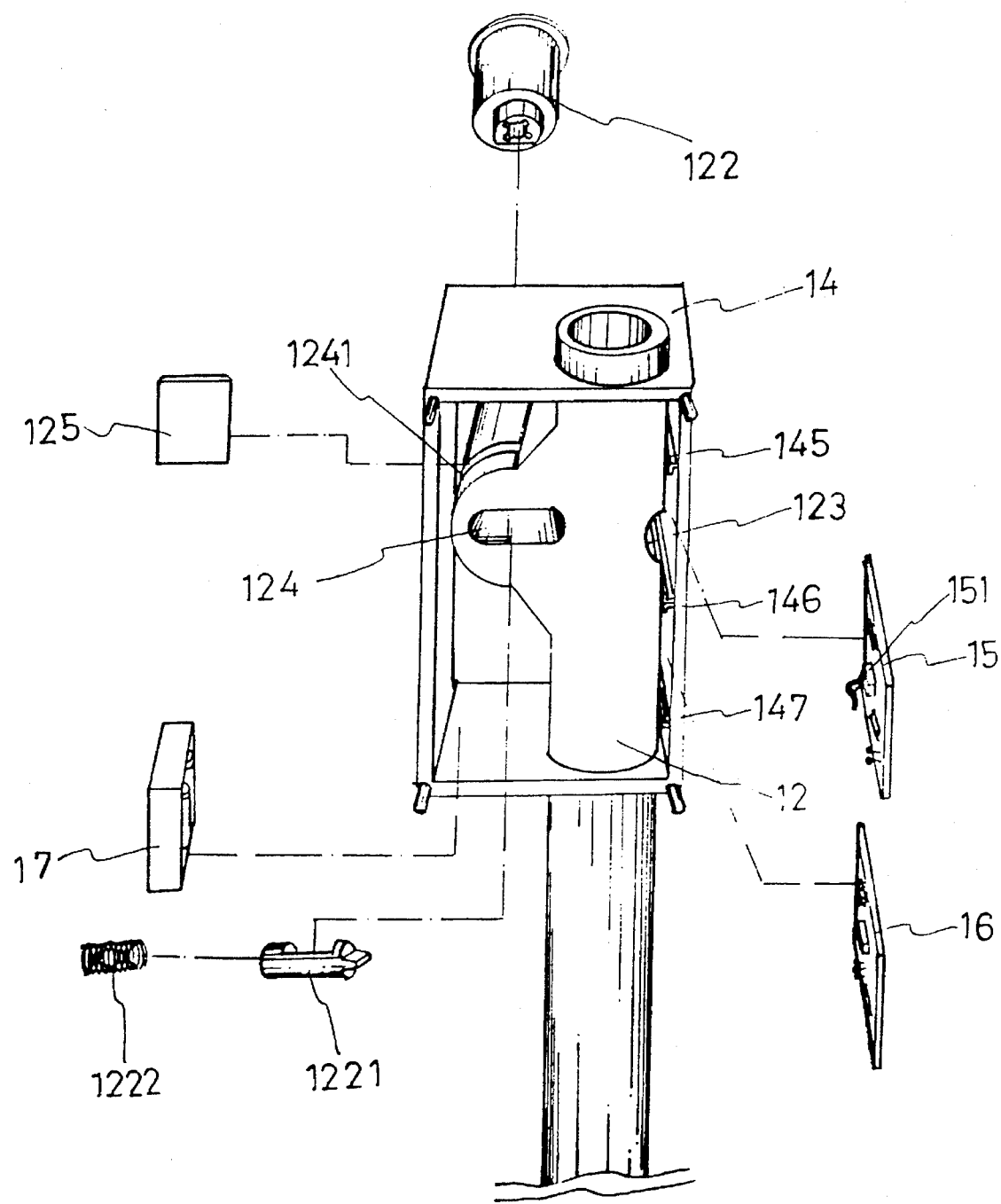
FIG. 11 is a diagram showing the partial structure of the integrally formed guard box.

Referring to FIGS. 9, 10, another embodiment of the present invention is disclosed. The guard box 14 and the receiving sheath 12 are integrally produced with a through hole 124 disposed behind a space for receiving the lock 122. A slot 1241 is defined on the nearby edge of the hole 124. A larger through hole 123 for housing the indirect transmission means 13 is provided, as shown in FIG. 11. The first alarm means 15 and the second alarm means 16 are fixed in place by engagement with the securing members 145, 146 and 147.

Figure 12:
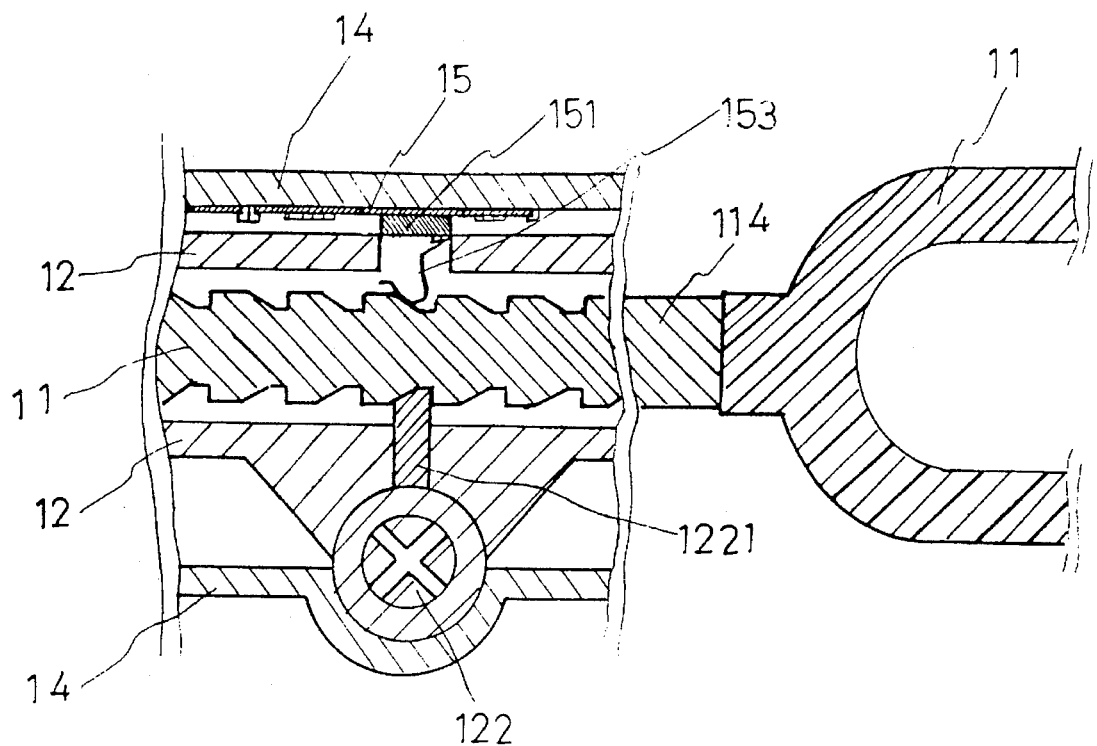
FIGS. 12, 13 are diagrams showing the operation modes of the actuation switch with respect of the lock stick.
Figure 13:
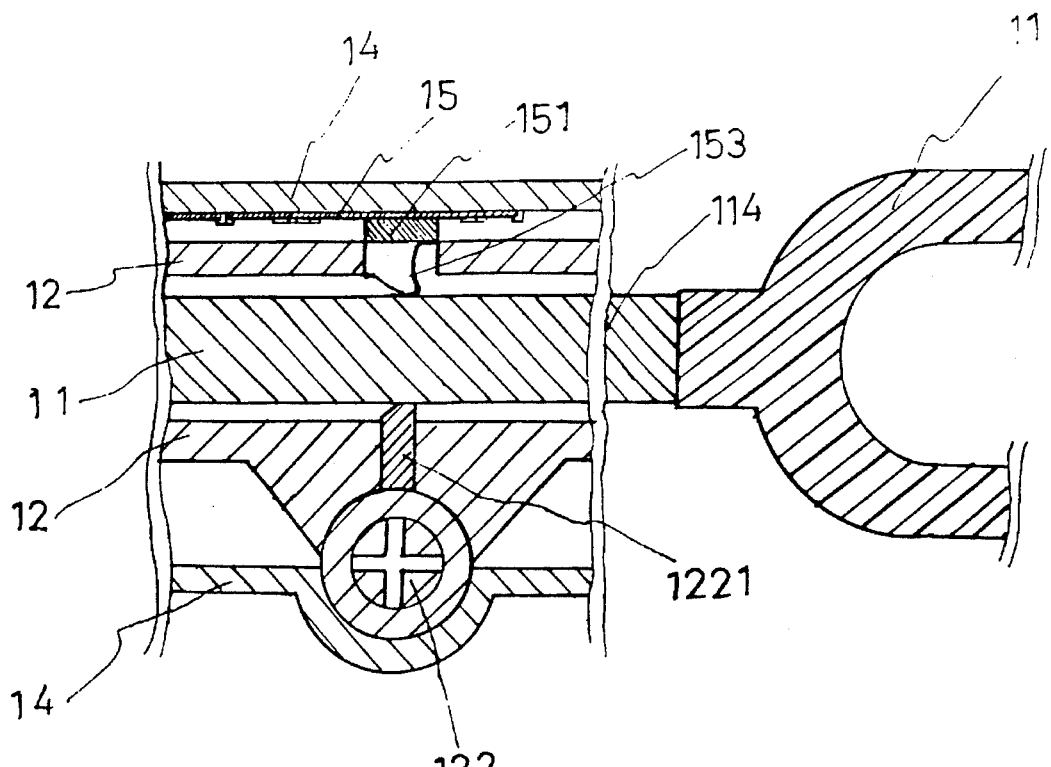

The actuation switch 151 of the first alarm means 15 is positioned in alignment with the through hole 123 of the receiving sheath 12, as shown in FIG. 12, with a bent abutment plate 153 in connection to the actuation switch 151 fit in the through hole 123 to replace the transmission means 13.

As the abutment plate 153 falls in one of the recesses 113, the first alarm means 15 is set on the alert and the same becomes non-operational when the abutment plate 153 is positioned at the smooth front section 114 of the lock stick 11.

Referring to FIG. 11, the latch pin 1221 and a bias spring 1222 operationally connected to the lock 122 are disposed in the through hole 124 and confined in place in the through hole 124 by way of a retaining plate 125 inserted in the slot 1241, facilitating the assembly of the present invention.

Figure 14:
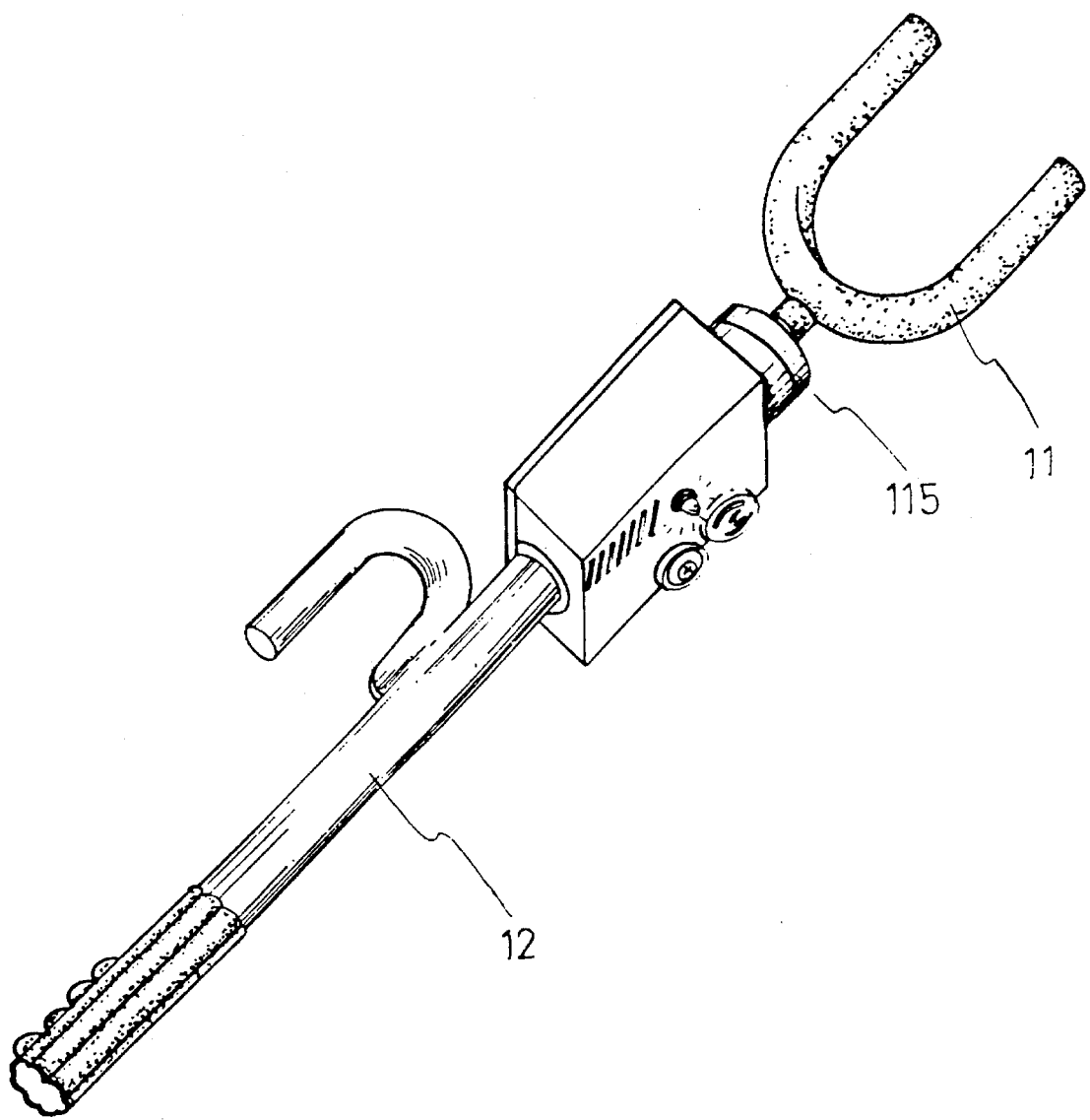
FIG. 14 is a diagram showing another embodiment of the present invention.
Figures 15, 15A, 15B:
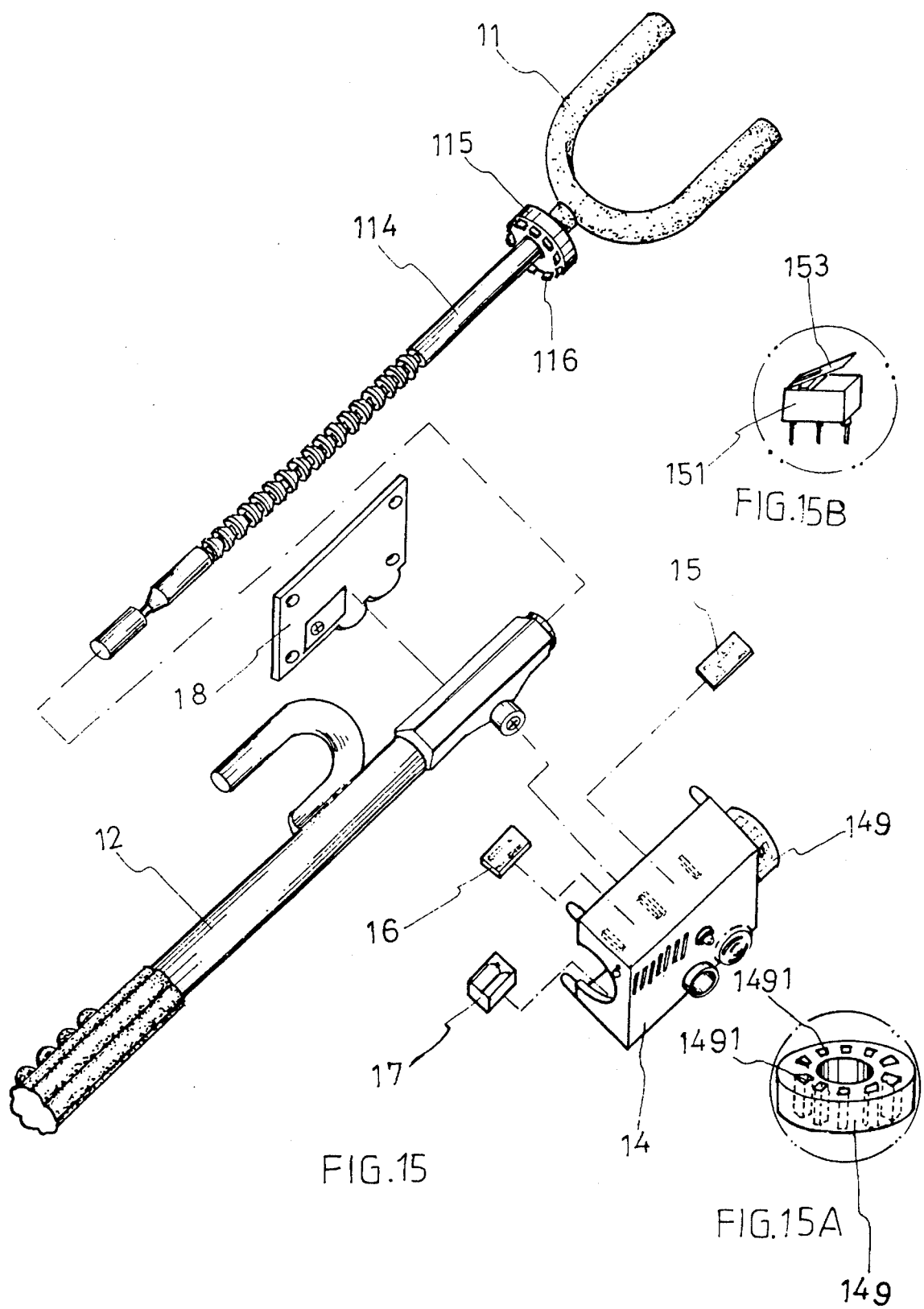
FIGS. 15, 15A, 15B are diagram showing the detailed structure of the embodiment of FIG. 14 with the actuation switch and the ring-like element enlarged.

As further shown in FIGS. 14, 15, the transmission means can be replaced by a ring-like element 115 having a plurality of peripherally disposed protrusions 116 on one side thereof fixed at the end of the smooth front section 114. A ring-like journal 149 having a plurality of cavities 1491 defined on one side thereof, as shown in FIG. 15A, is secured to one side of the guard box 14. The guard box 14 is secured to the receiving sheath 12 in such a manner that protrusions 116 are engageable with the corresponding cavities 1491 of the journal 149 when the lock stick 11 is pushed inwardly. A mini actuation switch 151 having a bent abutment plate 153, as shown in FIG. 15B, is housed in one of the cavities 1491 so that when the ring-like element 115 is pushed against the journal 149 of the guard box 14, one of the protrusions 116 can abut against the abutment plate 153 to render the first alarm means 15 in function and on the alert.

Referring further to FIG. 16, a third embodiment of the present invention is disclosed. At the bottom end of the receiving sheath 12 is disposed a connector 19 in which the first alarm means 15 is securedly fixed. The speaker 141 is secured to a sound outlet 193 of the connector 19, and the actuation switch 151 is located in a cavity 191 of the connector 19. The connector 19 is screwed to the bottom of the receiving sheath 12 with the sound outlet 193 thereof in alignment with the sound outlet 126 of the receiving sheath 12.

Figure 17:
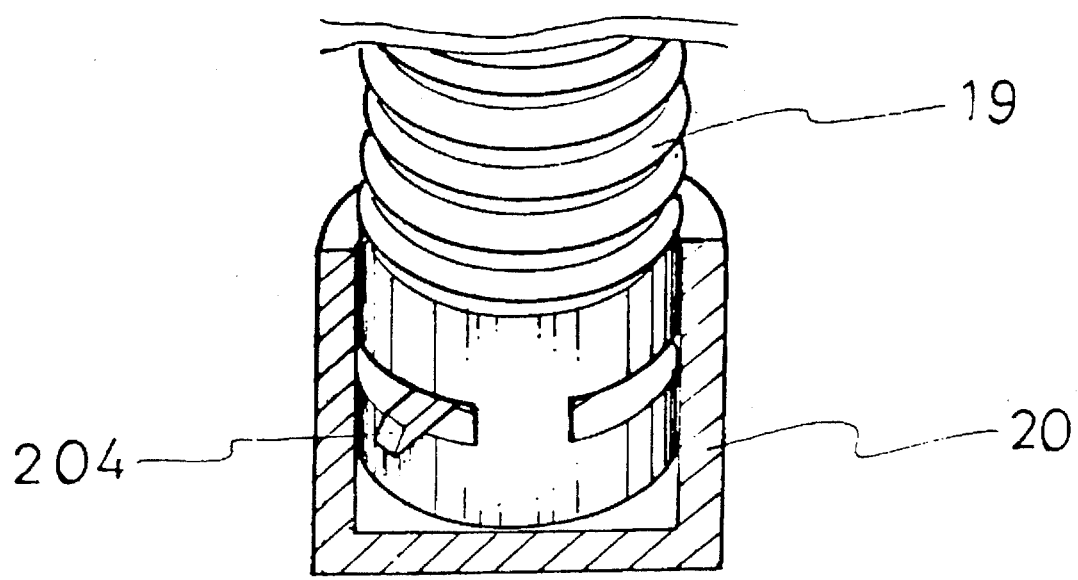
FIG. 17 is a diagram showing the engagement of the bottom lid with the connector.

The LED 143 of the receiving sheath 12 is electrically connected to the first alarm means 15 by wires (not shown) which are led through a through hole 192 of the connector 19. The actuation switch 151 is also electrically connected to the first alarm means 15 by wires (not shown). A bottom lid 20 has two retaining arms 204 that are retractably moved by bias springs 203 and are movably driven toward each other by a gear 202 that is controlled by a key inserted into a key hole 201 of the bottom lid 20. A cover 205 is mounted on top of the above described two arms 204. The connector 19 is provided with two openings 194, as shown in FIG. 17, so as to permit the two spring biased arms 204 to stick out thereof when the bottom lid 20 is secured in place to the connector 19.

Figure 18:
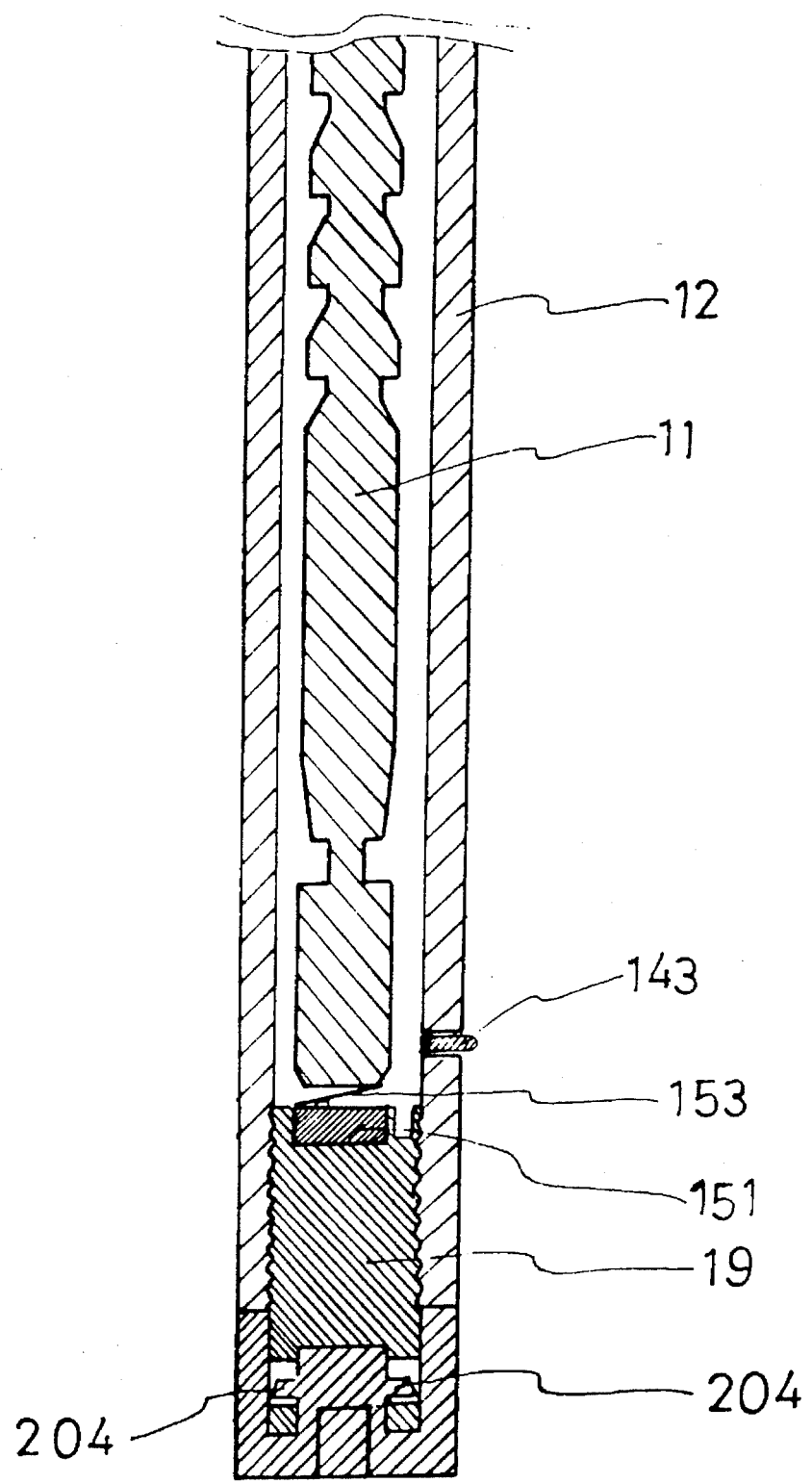
FIG. 18 is a sectional diagram showing the operation mode of the embodiment illustrated in FIG. 16.

Referring to FIG. 18, when the lock stick 11 is inserted into the receiving sheath 12, the bottommost end of the lock stick 11 will abut against the abutment plate 153 of the actuation switch 151, putting the first alarm means 15 in a reset mode without function. When the lock stick 11 is pulled outwardly, the abutment plate 153 bounces back, so as to put the first alarm means 15 in an alert state and ready to function.

I claim:

1. A steering wheel lock for use on vehicles, comprising:

a lock stick having a smooth front section connected to a locking section having a plurality of spaced dentiform protrusions with a recess defined between every pair of protrusions;

a receiving sheath in which said lock stick is movably inserted;

a guard box mounted to said receiving sheath;

a lid engaged with said guard box having an openable gate for easy replacement of battery means housed therein;

a first alarm means in connection to an actuation switch;

a second alarm means in connection to an actuation switch;

a power supply means housed in said guard box for supply of power to said first and second alarm means;

an indirect transmission means disposed in a through hole defined in said receiving sheath; said guard box having a lock mounting hole a speaker being disposed adjacent to the lock mounting hole;

an LED disposed next to said lock mounting hole being connected to said first alarm means and said second alarm means by wires;

said guard box having a number of retaining members for fixing said first and said second alarm means in place;

said first alarm means having an actuation switch which is equipped with a retractable button;

said indirect transmission means having a drive pin having a top head disposed in alignment with said retractable button of said actuation switch in such a manner that as said top head is urged to move upwardly, said retractable button is pushed inwardly;

said transmission means having a driven end which falls into one of said recesses of said dentiform protrusions of said lock stick so as to keep said top head of said drive pin from coming into contact with said actuation switch;

said top head of said drive pin of said transmission means coming into contact with said retractable button, forcing said button to be pressed inwardly, as said driven end of said transmission means is in contact with said smooth front section of said lock stick, rendering said first alarm means in a reset state without being actuated.

2. The steering wheel lock as claimed in claim 1 wherein a reset pin is disposed in one corner of said guard box and is insertable into the actuation switch of said second alarm means so as to stop said second alarm means from functioning; and said second alarm means is actuated on said reset pin being pulled out of engagement therewith when said steering wheel lock is not mounted to a steering wheel of a vehicle.

* * * * *